United States Patent [19]
Patrick et al.

[11] Patent Number: 6,158,720
[45] Date of Patent: Dec. 12, 2000

[54] ANTI-BACKLASH NUT ASSEMBLY

[75] Inventors: Paul Douglas Patrick, Kettering; Edward Burbank Sorauf, Fiarborn, both of Ohio

[73] Assignee: Joyce/Dayton Corporation, Dayton, Ohio

[21] Appl. No.: 09/366,086

[22] Filed: Aug. 3, 1999

Related U.S. Application Data

[60] Provisional application No. 60/095,061, Aug. 3, 1998.

[51] Int. Cl.[7] ........................................... B66F 3/18
[52] U.S. Cl. ............................. 254/103; 74/104
[58] Field of Search .................... 74/441, 409; 254/103, 254/DIG. 2, DIG. 8, 92

[56] References Cited

U.S. PATENT DOCUMENTS

| | | |
|---|---|---|
| Re. 31,713 | 10/1984 | Erikson et al. . |
| 3,176,963 | 4/1965 | Sturm . |
| 3,323,777 | 6/1967 | McMullen . |
| 3,721,133 | 3/1973 | Denkowski . |
| 3,760,686 | 9/1973 | Goodwin . |
| 3,857,547 | 12/1974 | Profet . |
| 4,008,625 | 2/1977 | Malhotra . |
| 4,131,031 | 12/1978 | Erikson et al. . |
| 4,353,264 | 10/1982 | Erikson et al. . |
| 4,753,124 | 6/1988 | Chevance . |
| 4,872,795 | 10/1989 | Davis . |
| 4,954,032 | 9/1990 | Morales . |
| 4,974,464 | 12/1990 | Erikson et al. . |
| 5,184,806 | 2/1993 | Erschens et al. . |

*Primary Examiner*—David A. Scherbel
*Assistant Examiner*—Daniel Shanley
*Attorney, Agent, or Firm*—Biebel & French

[57] ABSTRACT

An anti-backlash nut assembly (10) has a first part (12), a second part (14), and at least one drive pin (16) to rotationally couple the second part to the first part while permitting axial movement therebetween. The first part includes a collar portion (30) having an inner circumferential wall (34) having at least one axially extending drive pin recess (38) therein. The second part includes a boss portion (54) having an outer circumferential wall (56) having at least one corresponding drive pin recess (60) therein. The boss portion is adapted for sliding engagement with the collar portion and is received therein. The at least one second part drive pin recess is circumferentially aligned with the at least one first part drive pin recess to define a drive pin channel (70). At least one drive pin is slidingly engaged in the at least one drive pin channel. In a preferred embodiment, the first part is a worm gear and the second part is an anti-backlash nut.

16 Claims, 9 Drawing Sheets

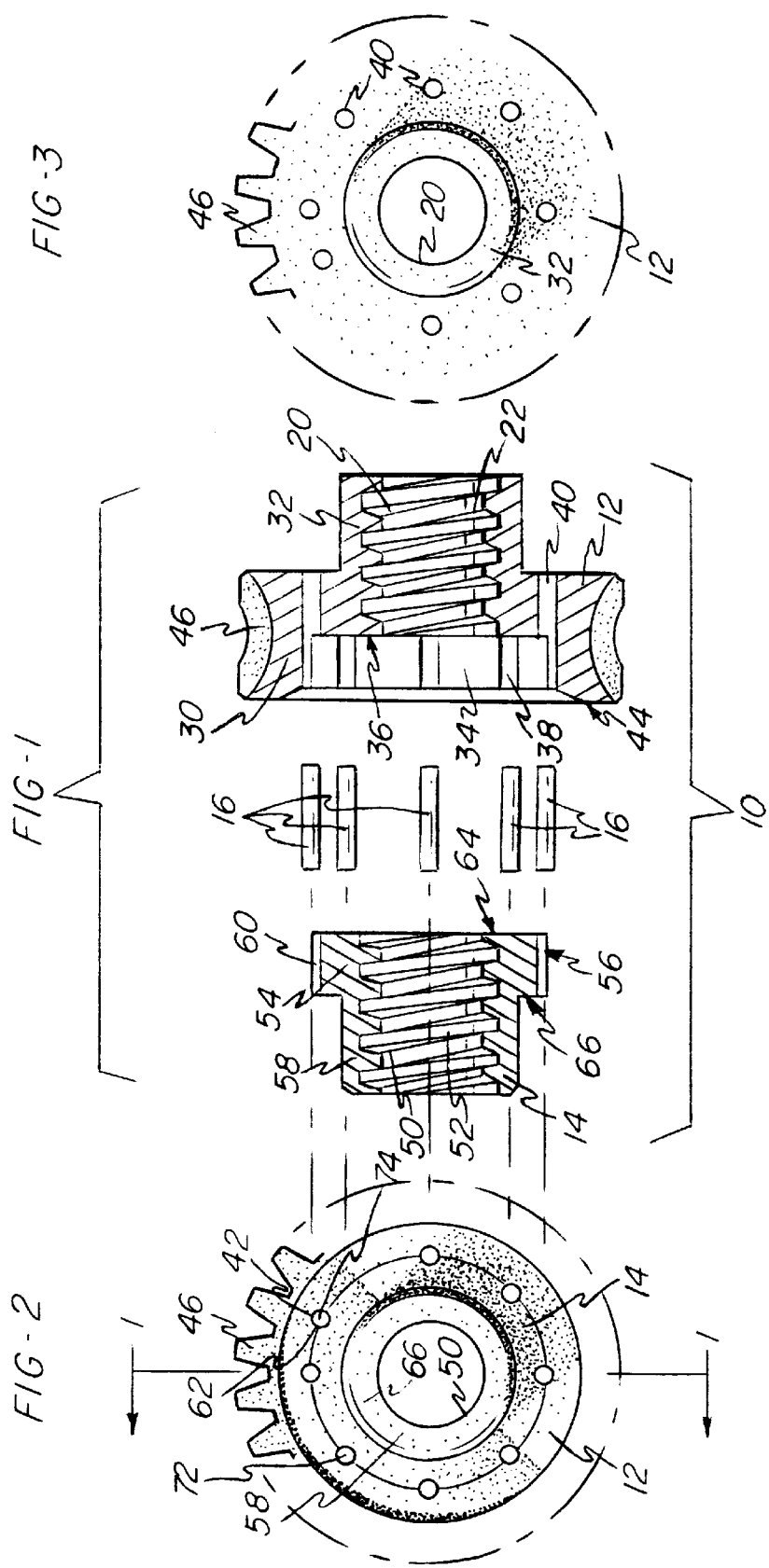

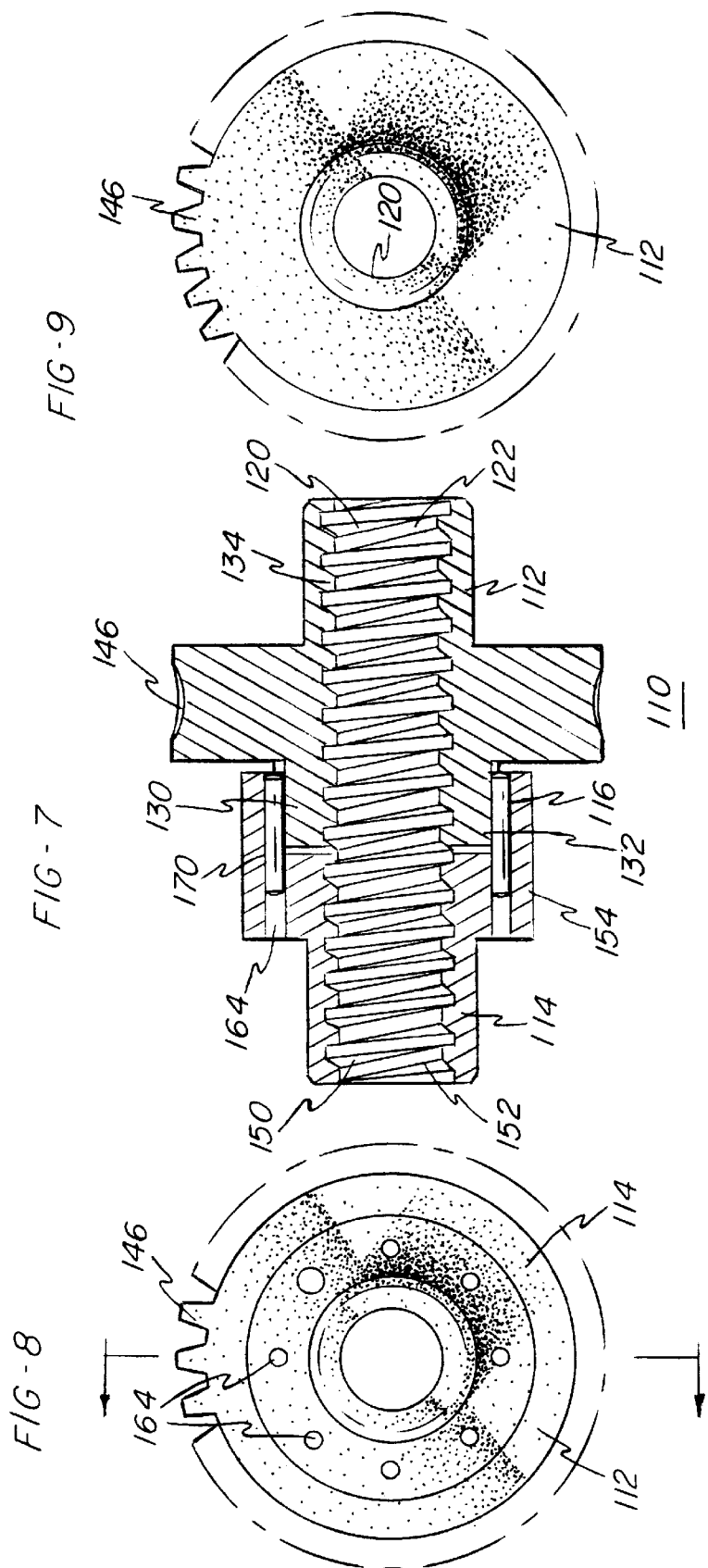

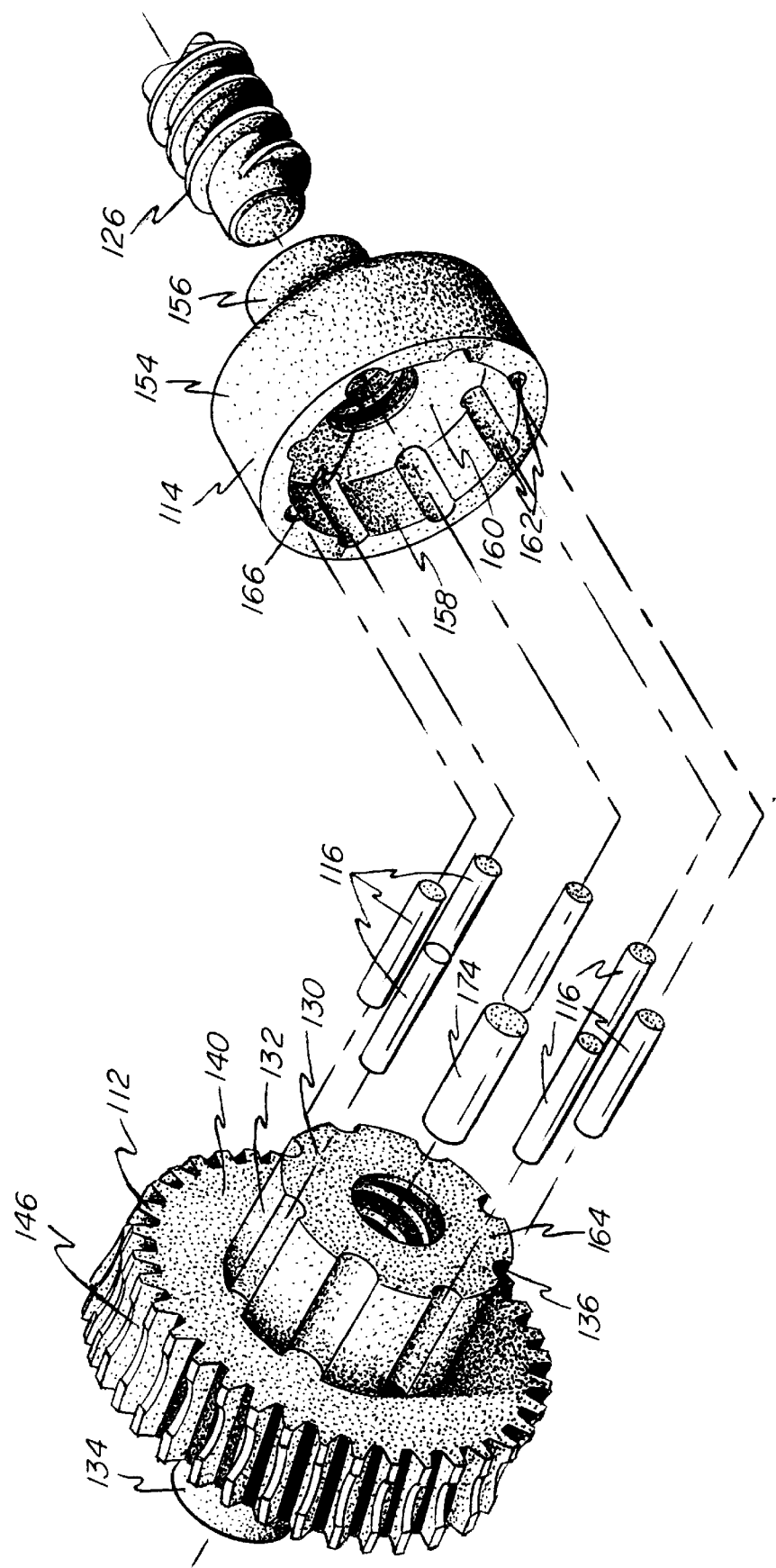

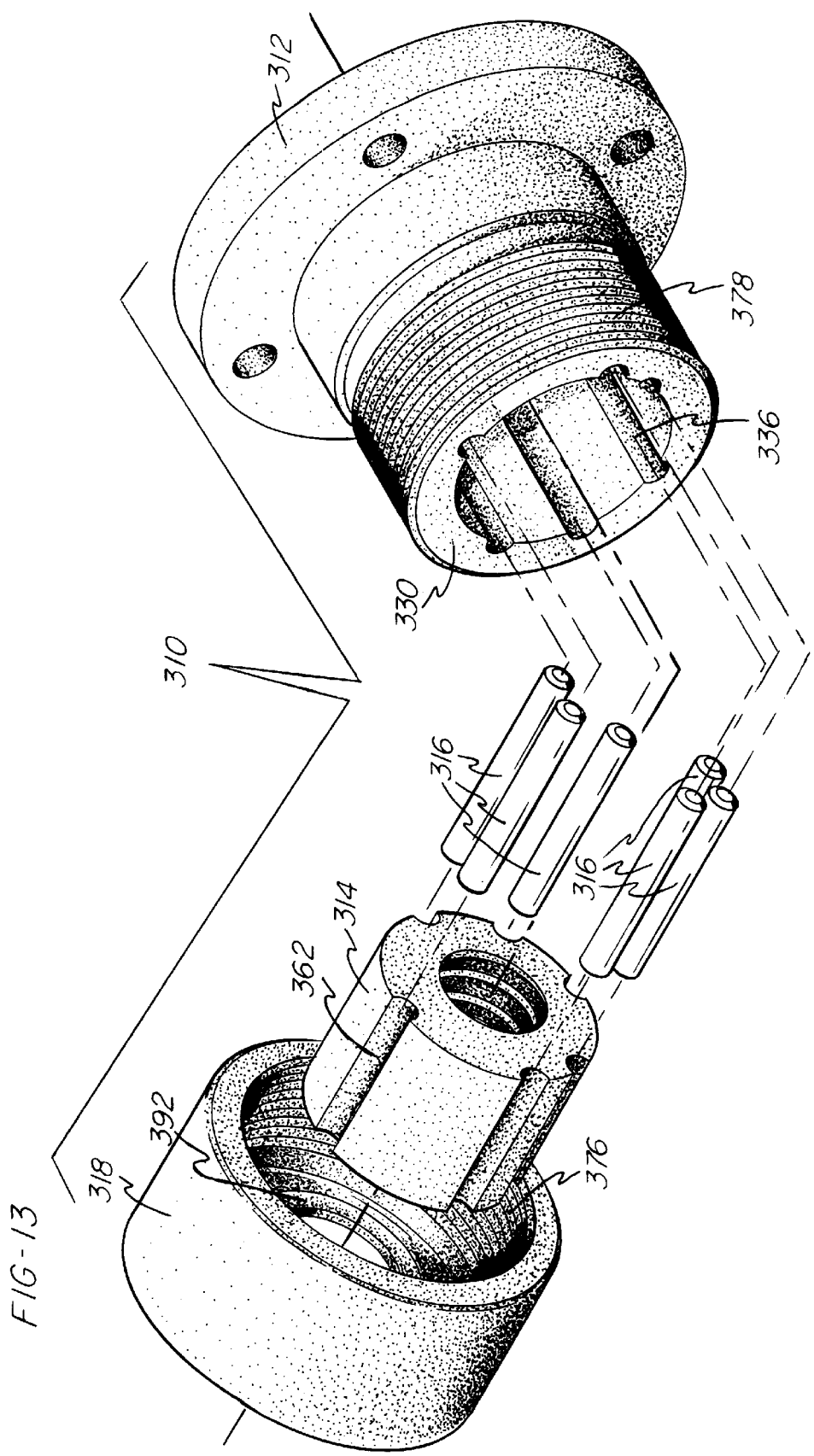

ANTI-BACKLASH NUT ASSEMBLY

CROSS-REFERENCES TO RELATED APPLICATIONS

This application claims the benefit of U.S. Provisional Application No. 60/095,061, filed Aug. 3, 1998.

BACKGROUND OF THE INVENTION

The present invention relates to an anti-backlash nut assembly, and more particularly to an anti-backlash nut assembly for use in a type of jack known commonly as a worm gear screw jack, and in linear actuators.

Worm gear screw jacks of the type employing a non-rotating jack screw extended and retracted by a worm gear threaded thereon, with the worm gear driven by a worm shaft oriented perpendicular to the jack screw, are well known. Two examples of such are shown in U.S. Pat. No. 3,176,963, issued to Sturm Apr. 6, 1965, and U.S. Pat. No. 3,323,777, issued to McMullen Jun. 6, 1967, both of which are incorporated herein by reference to the extent necessary to complete this disclosure.

In many worm gear screw jacks, the jack screw is made of hardened steel while the worm gear is made of a softer material such as aluminum bronze. As a result, the interior threads of the worm gear tend to wear due to friction, ultimately introducing backlash or end play into the jack when the load switches between tension and compression.

In the past, attempts have been made to eliminate this backlash. One such method used is to split the worm gear in half and provide for each half to be axially spaced from the other. The worm gear halves are then clampingly engaged on the jack screw threads and timed together with pins. However, such a solution suffers from the disadvantage of breaking up the worm gear tooth contact with the worm shaft, thereby increasing the pressure on the worm gear threads. In addition, the pins are subject to bending, resulting in misalignment of the worm gear halves, subjecting the worm gear to additional friction loading.

Another attempt to eliminate backlash uses a separate anti-backlash nut rotatably driven by the worm gear. The nut is adjusted to apply pressure to the jack screw thread faces opposite those faces in contact with the interior threads of the worm gear. The McMullen patent discussed above discloses such an arrangement.

However, the driving pins of McMullen are still subject to significant bending forces since a segment thereof extending transverse to the longitudinal axis of the pin is not supported by a collar or like housing mechanism.

Linear actuators of the type employing an axially traveling nut assembly driven back and forth by a rotating screw threaded therethrough are well known. Two examples of such are shown in U.S. Pat. No. 4,954,032, issued to Morales Sep. 4, 1990, and U.S. Pat. No. 4,008,625, issued to Malhotra Feb. 22, 1997, both of which are incorporated herein by reference.

Such traveling nut assemblies typically include two nut disposed in end-to-end relation to each other. The nuts are free to move axially relative to each other while being rotationally fixed relative to each other by means of axially extending splines or fingers. However, such splines and fingers tend to be subject to bending or breaking at unsupported portions thereof as a result of bending moments or shear forces acting transverse to their long axes.

SUMMARY OF THE INVENTION

The present invention overcomes the disadvantages discussed above by providing an improved anti-backlash nut assembly including a first nut having a central threaded portion adapted to mate with the threads of a screw, and a collar portion coaxial with and surrounding the threaded portion. The collar extends axially away from the threaded portion and has an inner circumferential wall having a diameter larger than the diameter of the central threaded portion. The inner wall further has at least one hemi-cylindrical drive pin recess extending axially therein.

The anti-backlash nut assembly further includes a second nut having a central threaded portion adapted to mate with the threads of the screw, and a boss portion coaxial with the second nut threaded portion extending radially from the second nut threaded portion. The boss portion is adapted for sliding engagement in the first nut collar portion. The boss portion includes an outer circumferential wall that has at least one hemi-cylindrical drive pin recess extending axially therein for axial alignment with the first nut drive pin recess.

The boss portion of the second nut is received in the collar portion of the first nut with the at least one drive pin recess of the second nut circumferentially aligned with the corresponding at least one drive pin recess of the first nut. The aligned drive pin recesses define at least one cylindrical drive pin channel. At least one cylindrical drive pin is received in the at least one drive pin channel to rotationally couple the second nut to the first nut while permitting axial movement therebetween.

Thus, a principal object of the present invention is to provide an improved anti-backlash nut assembly in which the forces acting on the pins coupling the second nut to the first nut are acting in shear along the length of the pins through the longitudinal axes of the pins, thereby substantially reducing bending moment in the pins and ensuring even thread wear in the nuts.

Other objects and advantages of the invention will be apparent from the following description, the accompanying drawings and the appended claims.

BRIEF DESCRIPTION OF THE DRAWINGS

FIG. 1 is a sectional elevation view of a first embodiment of an anti-backlash nut assembly in accordance with the invention;

FIG. 2 is a top plan view of the anti-backlash nut assembly of FIG. 1;

FIG. 3 is a bottom plan view of the anti-backlash nut assembly of FIG. 1;

FIG. 7 is a sectional elevational view of a second embodiment of an anti-backlash nut assembly in accordance with the invention;

FIG. 8 is a top plan view of the anti-backlash nut assembly of FIG. 7;

FIG. 9 is a bottom plan view of the anti-backlash nut assembly of FIG. 7;

FIG. 10 is an exploded perspective view of the anti-backlash nut assembly of FIG. 7.

FIG. 13 is an exploded perspective view of the anti-backlash nut assembly of FIG. 12.

DETAILED DESCRIPTION OF THE INVENTION

Figure 4:
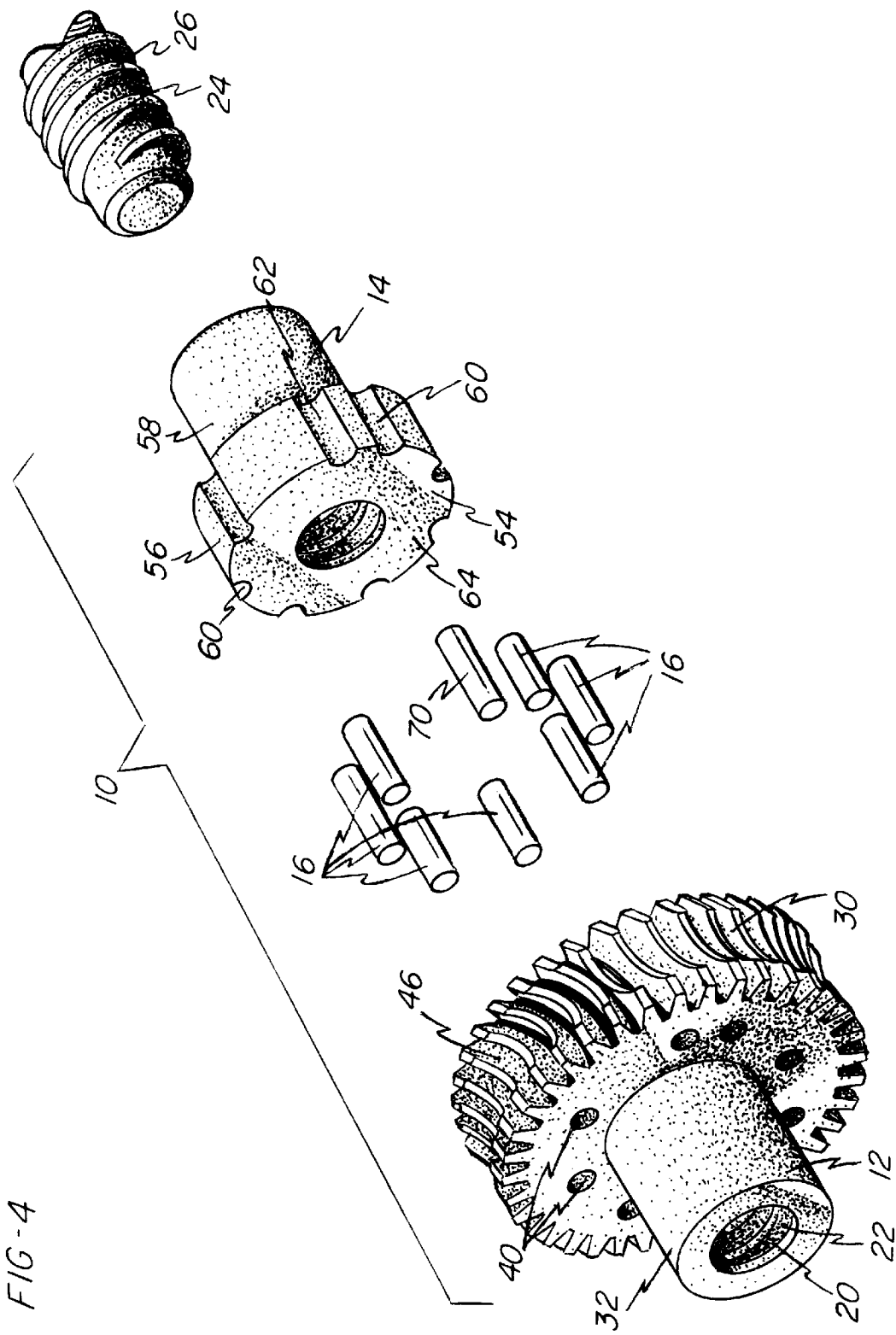
FIG. 4 is an exploded perspective view of the anti-backlash nut assembly of FIG. 1.

Referring to the drawings in greater detail, a first embodiment of an improved anti-backlash nut assembly 10 is shown in FIGS. 1–4 as including a worm gear 12, an anti-backlash nut 14, and a plurality of drive pins 16.

Figure 6:
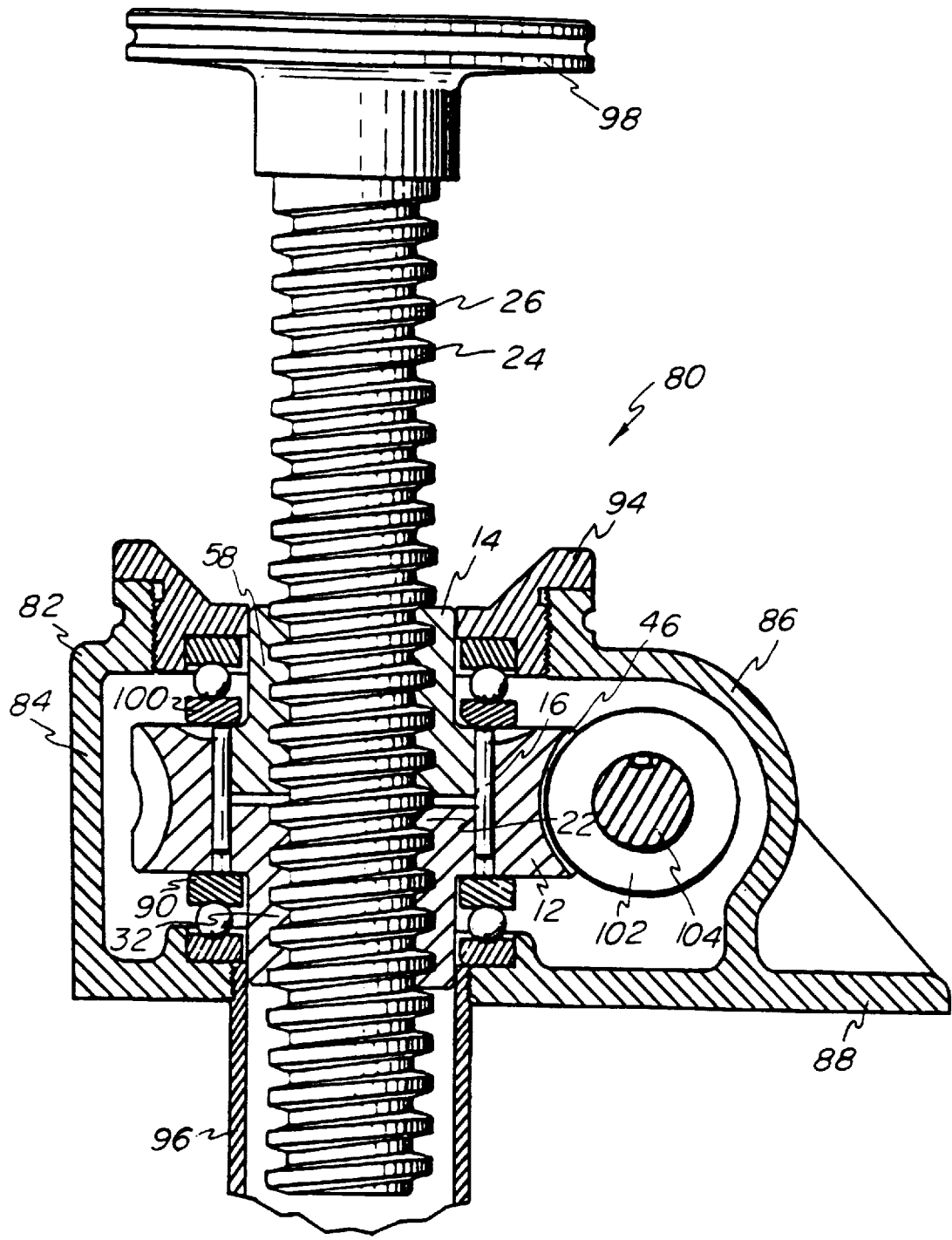
FIG. 6 is a sectional elevational view of the screw jack of FIG. 5 embodying the anti-backlash nut assembly of FIG. 1.

The worm gear 12 includes a central portion 20 having internal threads 22 proportioned so as to mate with the external threads 24 of a jack screw 26 (shown in FIG. 6). While the worm gear 12 is made of bronze, it may be made of other materials as desired, such as, for example, aluminum, steel, or plastic.

Coaxial with the worm gear central portion 20 and extending axially therefrom is a collar portion 30. Coaxial with the worm gear central portion 20 and extending axially in the opposite direction from the collar portion 30 is a hub portion 32. The collar portion 30 includes an inner circumferential wall 34 coaxial with the central threaded portion 20 and spaced radially outwardly from the threaded portion 20. The inner diameter of the circumferential wall 34 is larger than the maximum inner diameter of the threaded portion 20.

Extending radially outwardly from the threaded portion 20 to the inner circumferential wall 34 is a collar transverse wall 36. Arranged about the inner circumferential wall 34 are a plurality of hemi-cylindrically shaped axially extending drive pin recesses 38 having a length that extends the full axial length of the drive pins 16 (FIG. 6). Coaxial with the drive pin recesses 38 and extending axially into the worm gear 12 from the transverse wall 36 are a plurality of drive pin mounting holes 40 proportioned so as to receive and retain the drive pins 16 as by a pressure or other fit. One of the drive pin recesses 38 is a key drive pin recess 42 that has an unequal spacing with respect to the other drive pin recesses 38.

Coaxial with the central threaded portion 20 and extending radially outwardly from the inner circumferential wall 34 at the outward end of the collar portion 30 is an annular shoulder wall 44.

Coaxial with and disposed about the outer circumference of the collar portion 30 are a plurality of external concave worm gear threads 46. A plurality of lubricating channels (not shown) may extend radially outwardly from the inner circumferential wall 34 adjacent the transverse wall 36, or from the worm gear internal threads 22, to the external threads 46.

The nut 14 includes a central portion 50 having internal threads 52 proportioned so as to mate with the threads 24 of the jack screw 26. The nut 14, like the worm gear 12, is made of bronze, but may be made of other materials such as, without limitation, aluminum, steel, or plastic. Coaxial with and extending axially from the threaded portion 50 is a boss portion 54 having an outer circumferential wall 56. The boss portion 54 is proportioned for sliding engagement within the collar portion 30. Coaxial with and extending axially in the opposite direction from the boss portion 54 is a nut hub portion 58. The outer circumferential wall 56 includes a plurality of axially extending hemi-cylindrical shaped drive pin recesses 60. Each of the nut drive pin recesses 60 corresponds with (i.e., is in axial alignment with) one of the worm gear drive pin recesses 38. In the present embodiment, one nut drive pin recess 60 is a key drive pin recess 62 having an unequal spacing from the other nut drive pin recesses 60 and corresponding to the worm gear key drive pin recess 42.

Coaxial with the nut central portion 50 and extending radially outwardly from the central portion 50 to the outer circumferential wall 56 is an annular boss portion face 64. Coaxial with the nut central portion 50 and extending radially outwardly from the nut hub portion 58 to the outer circumferential wall 56 is a boss portion rear shoulder 66.

As shown, the drive pin recesses 38, 60 are equally circumferentially spaced, with the exception of one key drive pin 70, around the walls 34, 56, respectively, but this need not be the case. Eight worm gear drive pin recesses 38, including the key drive pin recess 42, cooperate with eight nut drive pin recesses 60, including nut key drive pin recess 62, to define eight cylindrical drive pin channels 72, including key drive pin channel 74. However, more or fewer drive pin recesses 38, 60 may be provided as desired so long as at least one drive pin channel 72 is defined. These channels 72 extend along the entire axial length of each drive pin.

The drive pins 16 are received within the drive channels 72 so as to couple the nut 14 to the worm gear 12 while permitting the nut 14 and the worm gear 12 to move axially relative to each other. The drive pins 16 are proportioned to be cylindrical, although they may have other shapes as well. For example, the drive pins 16 may have a square, rectangular, or polygonal cross-section as desired. Of course, the drive pin recesses 38, 60 and drive pin mounting holes 40 would have to be adapted as necessary to receive the drive pins.

The drive pins 16 are made of hardened steel, although other suitable materials may be used such as, without limitation, brass, bronze, aluminum, or plastic. The plurality of drive pins 16 in the present embodiment are identically proportioned. However, the key drive pin 70 has an unequal spacing from the other drive pins 16, and is adapted to be received in a drive channel 74 defined by the worm gear and nut key drive pin recesses 42, 62.

The key drive pin 70 ensures that the nut 14 is rotationally aligned with the worm gear 12 and that these two parts rotate with each other in unison. The internal threads 52 of the nut 14 are aligned with the internal threads 22 of the worm gear 12 so as to minimize frictional loading on the threads 24 of the jack screw 26. The key drive pin 70 could be made distinguishable from the other drive pins 16 by, for example, forming it to have a different shape, or by making it smaller or larger than the other pins 16. The distinguishing feature of the key drive pin may be instead of, or in addition to, its non-proportional spacing. Alternatively, the key drive pin 70 may be omitted altogether.

Figure 5:
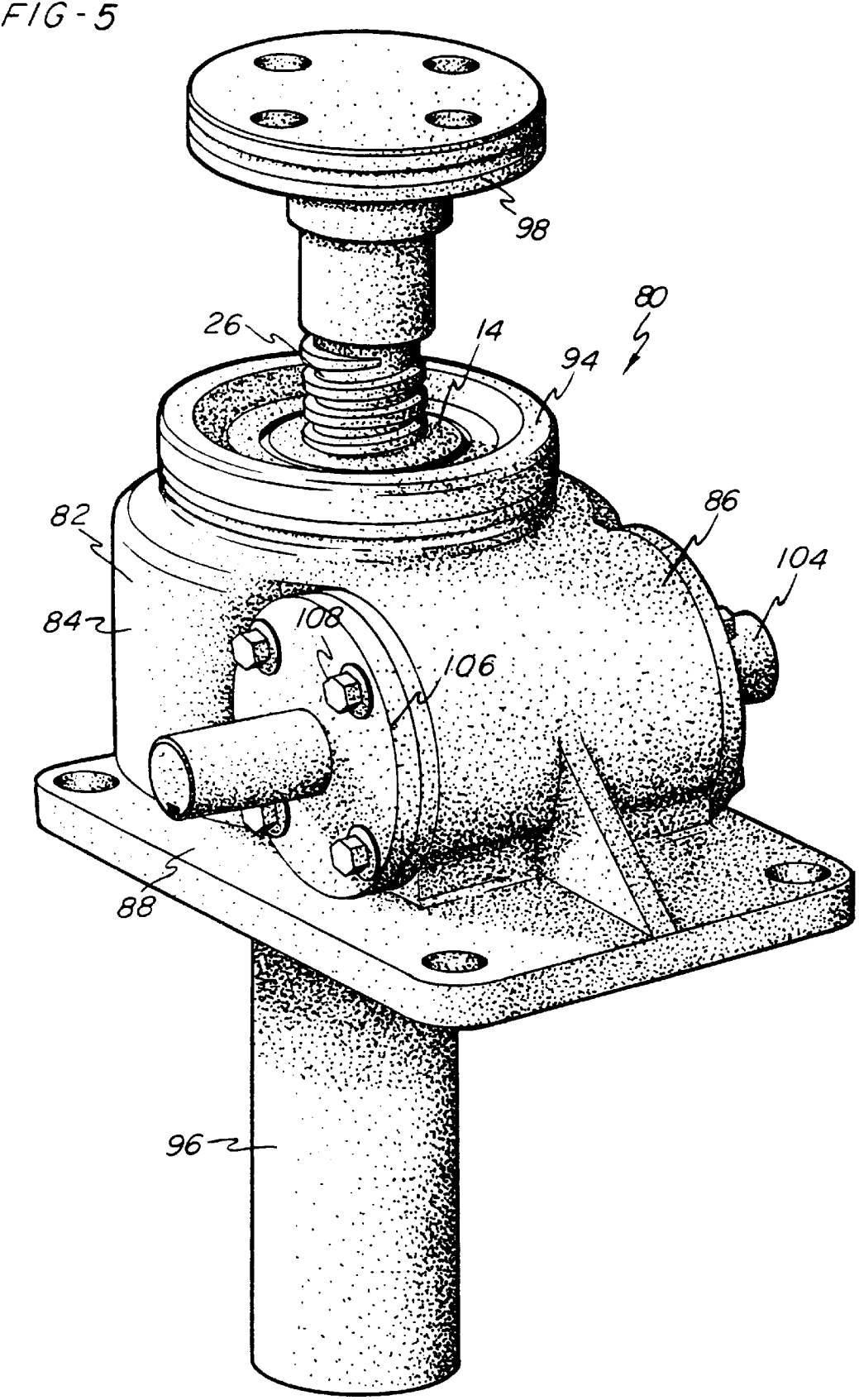
FIG. 5 is a perspective view of a worm gear screw jack embodying the invention.

In FIGS. 5 and 6 is shown a worm gear screw jack 80 using the present anti-backlash nut assembly 10. The screw jack 80 includes a housing 82 having a cylindrical jack screw portion 84 and a cylindrical worm portion 86 arranged at right angles to one another for receiving the various working parts of the jack 80. A base or mounting plate 88 is formed integral with the cylindrical portions 84, 86 such that the jack screw portion 84 projects vertically when the mounting plate 88 is attached to a horizontal surface.

Supported on the base of the jack screw portion 84 by means of a lower thrust bearing 90 is the worm gear 12 having internal threads 22 engaging and supporting the jack screw 26. The top of the jack screw 26 projects upwardly through a central aperture located within a housing cap 94 while its lower portion depends into a protection tube 96 attached as by a threaded connection to the bottom of the mounting plate 88. The jack screw 26 is adapted to engage and move a load (not shown) in an axial direction and for this purpose may be provided with a load engaging pad 98 at its upper end.

Turning to FIG. 6 specifically, the worm gear 12, which is concentric with the axis of rotation of the jack screw 26, is confined between the lower thrust bearing 90 and the bottom face of the jack screw threads 24. The nut 14, which is also concentric with the axis of rotation of the jack screw 26, is confined between an upper thrust bearing 100 and the top face of the jack screw threads 24. The bearings 90, 100 are received within recesses in the mounting plate 88 and the base of the housing cap 94, respectively. The bearings 90, 100 are conventional thrust bearings including ball elements caged in any suitable manner. The worm gear hub portion 32 projects axially downwardly within a central aperture formed within the lower thrust bearing 90 while the nut hub portion 58 projects axially upwardly through a central aperture formed within the upper thrust bearing 100.

Normally, the load engaging pad 98 is so attached to or otherwise engaged with the load that rotation of the jack screw 26 is prevented. The worm gear external threads 46 are engaged by a worm 102 mounted in the worm housing portion 86 on a worm shaft 104 disposed in right angular relationship to the direction of travel of the jack screw 26. The worm shaft 104 may be supported within the worm housing portion 86 by bearings (not shown) located adjacent to bearing caps 106 affixed as by cap screws 108 to the worm housing portion 86. Upon rotation of the worm 102, the worm gear 12 is rotated relative to the housing 82 and the jack screw 26 since the jack screw 26 is held against rotation and must move axially relative to the worm gear 12.

When the screw jack 80 is first assembled, the parts occupy the relationship shown in FIG. 6. The bottom faces of the jack screw threads 24 are urged downwardly against the upper faces of the worm gear internal threads 22. The bottom faces of the nut internal threads 52 are urged downwardly against the upper faces of the jack screw threads 24 by means of the housing cap 94 and the upper thrust bearing 100 to clampingly engage the threads 24 of the jack screw 26.

The boss portion face 64 will normally be initially spaced axially from the collar portion transverse wall 36 by a maximum wear gap not exceeding the thickness of one of the jack screw threads 24. Lowering of the jack screw 26 relative to the worm gear 12 caused by wear of the internal threads 22 of the worm gear 12 will result in an axial lowering of the nut 14 relative to the worm gear 12. Since the nut 14 is not connected to the worm gear 12 other than by the drive pins 16, and key drive pin 70, the nut 14 does not serve as a support for the jack screw 26 in normal operation. Thus, there is only a slight wearing of the internal threads 52 of the nut 14 or the internal threads 22 of the worm gear 12.

As the internal threads 22 of the worm gear 12 wear, additional backlash is introduced between the jack screw threads 24 and the worm gear internal threads 22. The housing cap 94 may be manually tightened to urge the nut 14 downwardly so as to eliminate the additional backlash. Alternatively, bias means, such as a spring (not shown), may be provided between the housing cap 94 and the upper thrust bearing 100 so as to automatically urge the nut 14 downwardly.

After prolonged use, the internal threads 22 of the worm gear 12 will wear to the point that the boss portion face 64 contacts the collar portion transverse wall 36. The nut 14 can no longer be urged downwardly relative to the worm gear 12 to take up additional backlash. The worm gear 12 should then be replaced.

Although the first embodiment of the invention is preferred, a second embodiment 110 of an anti-backlash nut assembly in accordance with the invention is shown in FIGS. 7–10. The second embodiment 110 includes a worm gear 112, an anti-backlash nut 114, and a plurality of drive pins 116.

The worm gear 112 includes a central portion 120 having internal threads 122 proportioned so as to mate with the external threads of a jack screw 126. Coaxial with the worm gear central portion 120 and extending axially therefrom is a boss portion 130 having an outer circumferential wall 132. Coaxial with and extending axially in the opposite direction from the boss portion 130 is a hub portion 134. The outer circumferential wall 132 includes eight axially-extending, circumferentially-spaced, hemi-cylindrically shaped drive pin recesses 136 positioned equi-angularly circumferentially about the outer circumferential wall 132. One worm gear drive pin recess 136 is a key drive pin recess 138 having a larger diameter than the other worm gear drive pin recesses 136.

Coaxial with the central portion 120 and extending radially outwardly from the central portion 120 to the outer circumferential wall 132 is an annular boss portion face 140. Coaxial with and disposed about a circumference of the worm gear 112 are a plurality of external concave worm gear threads 146 adapted to mesh with the threads of a worm.

The second embodiment anti-backlash nut 114 includes a central portion 150 having internal threads 152 proportioned so as to mate with the threads of the jack screw. Coaxial with the central portion 150 and extending axially therefrom is a collar portion 154. Coaxial with the nut central portion 150 and extending axially in the opposite direction from the collar portion 154 is a hub portion 156.

The collar portion 154 includes an inner circumferential wall 158 coaxial with the central threaded portion 150 and spaced radially outwardly from the threaded portion 150. Extending radially outwardly from the threaded portion 150 to the inner circumferential wall 158 is a collar transverse wall 160. Arranged about the inner circumferential wall 158 are eight hemi-cylindrically shaped axially extending drive pin recesses 162.

Coaxial with the drive pin recesses 162 and extending axially into the nut 114 from the transverse wall 160 are eight drive pin mounting holes 164 proportioned so as to receive the drive pins 116 as by a pressure fit. One of the drive pin recesses 162 is a key drive pin recess 166 that has a larger diameter than the other drive pin recesses 162.

The nut drive pin recesses 162 are in axial alignment with the worm gear drive pin recesses 138 to define drive channels 170 adapted to accommodate the drive pins 116 in sliding engagement. In particular, the nut key drive pin recess 166 cooperates with the worm gear key drive pin recess 138 to define a key drive pin channel for receiving a key drive pin 174.

Figure 11:
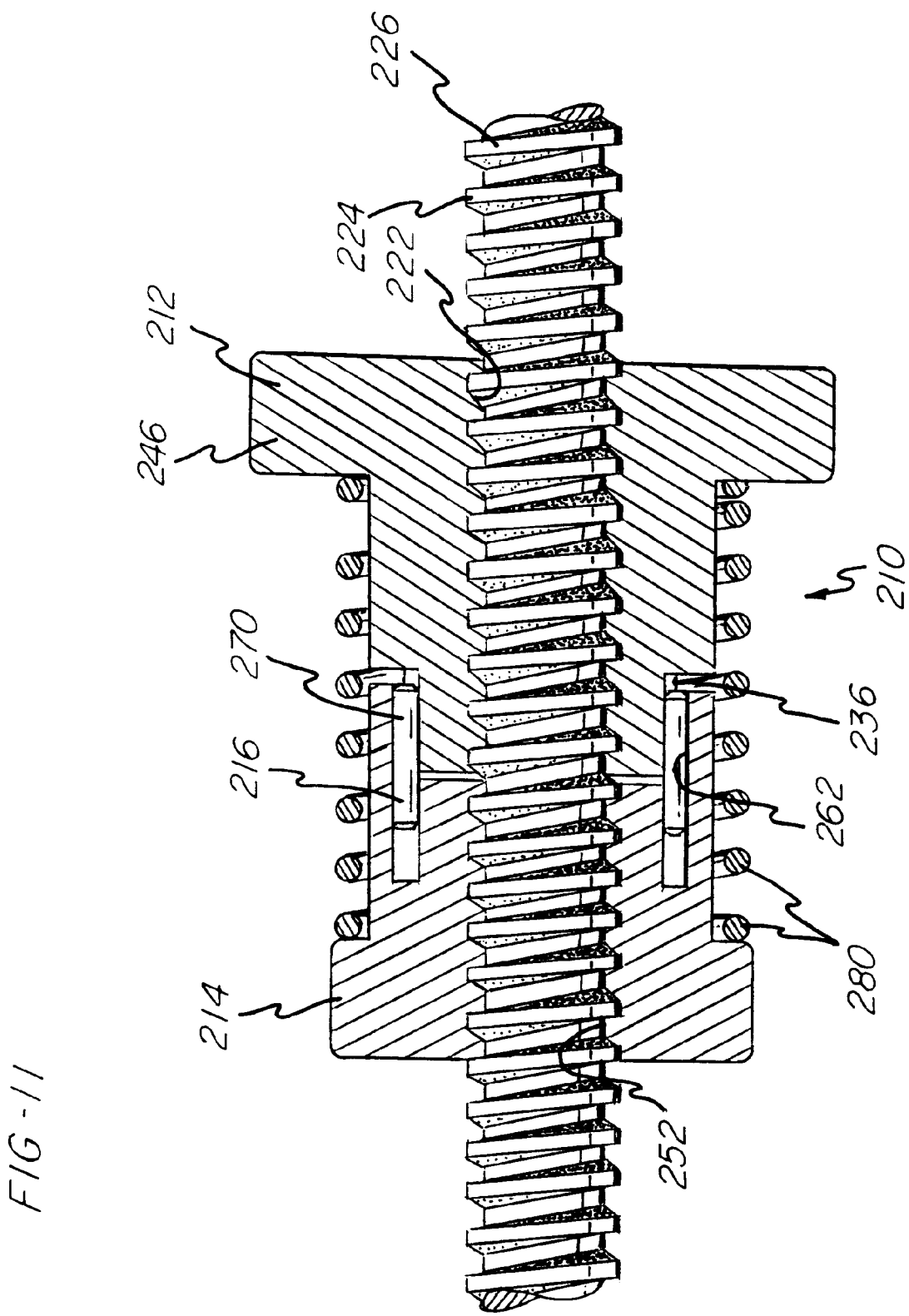
FIG. 11 is a sectional elevation view of a third embodiment of the anti-backlash nut assembly in a linear actuator.

Referring to FIG. 11, there is shown a third embodiment 210, similar to the second embodiment 110, of the anti-backlash nut assembly in a linear actuator. The assembly 210 includes a first nut 212 and a second nut 214 disposed in end-to-end relation and formed with internal threads 222 and 252, respectively, which mate with the threads 224 of a screw 226. Normally, the screw 226 is rotated relative to the nut assembly 210 with the assembly 210 traveling axially relative to the screw 226. A mounting flange 246 projects generally radially outward from the outboard end of nut 212 and is adapted to be connected to a movable element (not shown) such as a component of a business machine.

The nuts 212, 214 are held against rotation relative to one another by means of drive pins 216 received in drive channels 270 defined by hemi-cylindrically shaped drive pin recesses 236 in the first nut 212 coaxially aligned with hemi-cylindrically shaped drive pin recesses 262 in the second nut 214. The screw 226 is normally held fixed axially while the nut assembly 210 is maintained in a rotationally stationary position in space. When the screw 226 is first rotated in one direction and then the other, the nut assembly 210 travels back and forth along the screw 226.

A spring 280 in compression (or in tension) axially biases the nuts 212, 214 apart (or together) so that the threads 222, 252 are pressed against the threads 224 of the screw 226 in such a manner that one of the nuts carries essentially all of the load when the screw 226 is rotated in one direction, while the other nut carries essentially all of the load when the screw 226 is rotated in the other direction.

Figure 12:
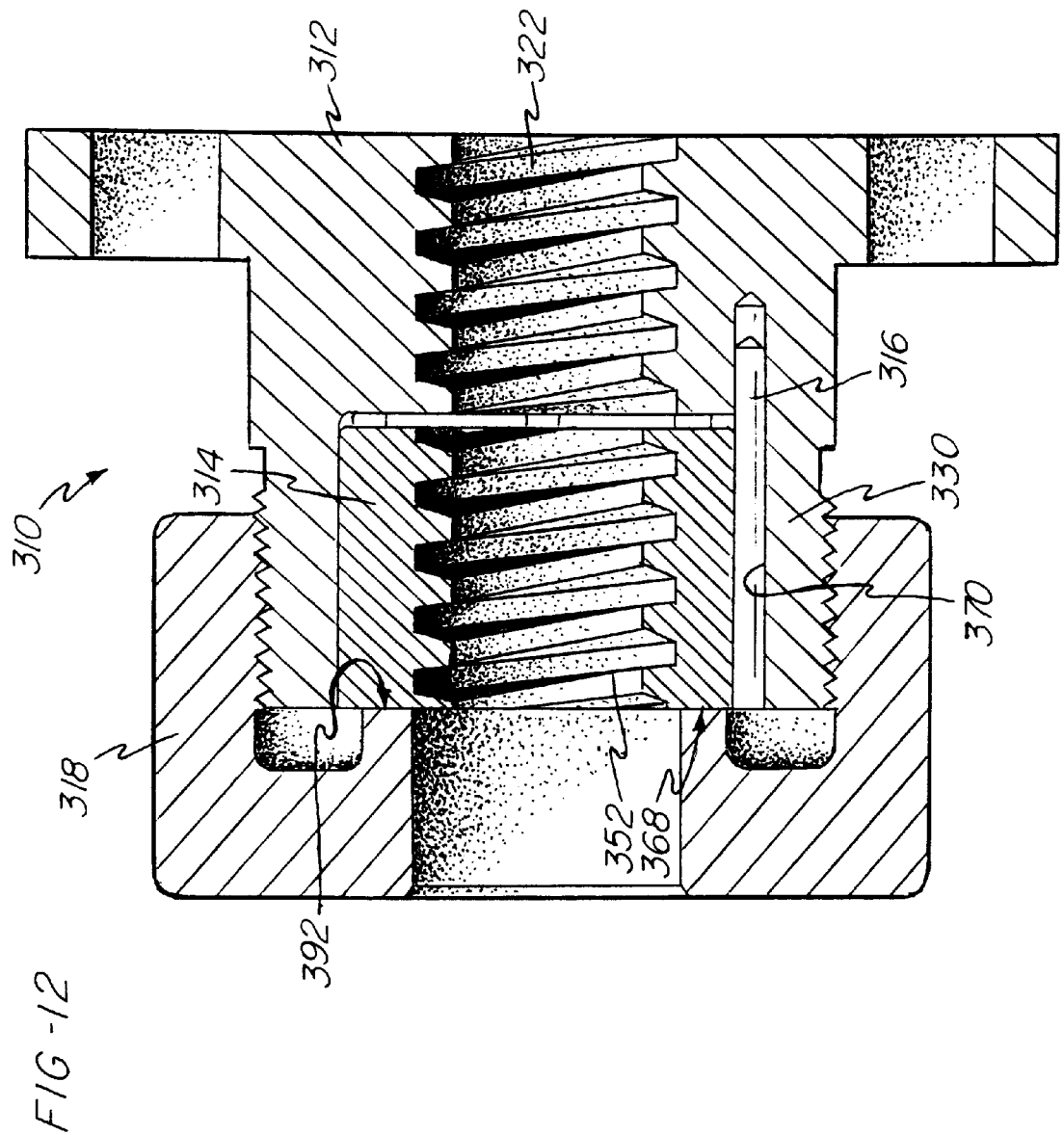
FIG. 12 is a sectional elevation view of a fourth embodiment of the anti-backlash nut assembly in a linear actuator.

Turning now to FIGS. 12 and 13, there is shown a fourth embodiment 310 of the anti-backlash nut assembly in a traveling nut configuration, such as might be used in a linear actuator. The assembly 310 includes a first nut 312 and a second nut 314 disposed in end-to-end relation and formed with internal threads 322 and 352, respectively, which mate with the threads of a screw (not shown) in a like fashion as the third embodiment 210.

The nut assembly 310 includes means for coupling the nuts 312 and 314 against relative rotation while permitting the nuts to move axially with respect to one another. These means comprise six angularly spaced drive pins 316 slidingly received in six angularly spaced drive pin channels 370 defined by first drive pin recesses 336 formed in a collar portion 330 of nut 312 cooperating with corresponding second drive pin recesses 362 formed in the outer periphery of nut 314.

The nut assembly 310 also includes an adjusting sleeve 318 for biasing the first nut 312 and the second nut 314 toward each other so as to ensure positive engagement of the screw threads in the axial directions. One end portion of the sleeve 318 is formed with an internal thread 376 that is screwed onto an external thread 378 formed on the outer periphery of the collar portion 330 of the first nut 312. In order to take up any clearance between the threads of the screw and the threads 322 and 352 of the nuts 312 and 314, the sleeve 318 is manually rotated in a tightening direction while the first nut 312 is held rotationally stationary. As the sleeve 318 turns, it moves axially toward the first nut 312. When the sleeve 318 has been sufficiently tightened, an interior shoulder 392 of the sleeve 318 engages an axially outboard face 368 of the second nut 314. Still further tightening of the sleeve 318 causes the sleeve shoulder 392 to bias the second nut 314 toward the first nut 312.

It is apparent then that in either embodiment of the invention, the drive pins are supported along their entire axial lengths by the drive pin channels. These channels comprise cylindrical cavities that extend along the lengths of the pins that are disposed therein.

Stated differently, in the preferred embodiment shown in FIGS. 1–6, the recesses 60 formed along the circumference of the boss carried by the nut mate with the recesses 38 formed along the inner circumferential wall of the shoulder carried by the worm. The recesses 60 and 38, together, form cylindrical cavities or enclosures with each cavity or enclosure housing and supporting a drive pin therein. The drive pins therefore are supported 360° around their periphery along their axial lengths except for a short transverse segment of each pin adjacent the gap between the anti-backlash nut and the worm gear. Even in this very short segment, the pin is supported throughout about 180° of its circumference by the recesses 38 formed in the shoulder portion of the worm.

Similarly, in the second embodiment, the axially extending cylindrical cavities are formed via combination of the recesses 136 formed on the outer wall of the boss carried by the worm and the corresponding recesses 162 formed along the inside of the shoulder carried by the nut.

Likewise, in the third embodiment shown in FIG. 11, the axially extending cavities are formed by the combination of the recesses 236 in the first nut 212 and the corresponding recesses 262 in the second nut 214.

Finally, in the fourth embodiment, shown in FIGS. 12 and 13, the axially extending channels are formed by the combination of the recesses 336 in the first nut 312 and the corresponding recesses 362 in the second nut 314.

The cavities or channels 72, 74, 170, 174, 270, and 370 are important in that they provide support for the pins along the entire axial length of each pin. In contrast, in the McMullen patent referenced above, the pins are supported by a collar and shoulder arrangement that leaves the pins unsupported at an annular gap 59 (See FIG. 3 in the McMullen patent). At this gap location the pins are subject to undue bending moment upon compression or tension.

In the present invention, the pins are in direct shear with the cavities along the longitudinal axes of the pins and accordingly, there is little or no bending moment exerted thereon.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. An anti-backlash nut assembly comprising:
   a first part having a central threaded portion positioned along a central axis and adapted to mate with the threads of a jack screw, and a collar portion coaxial with said threaded portion, said collar portion having an inner circumferential wall surrounding said threaded portion, said inner circumferential wall having at least one drive pin recess extending axially in said circumferential wall;
   a second part having a central threaded portion adapted to mate with the threads of said jack screw, and a boss portion coaxial with said second part threaded portion, said boss portion adapted for sliding engagement into said collar portion, said boss portion having an outer circumferential wall having at least one drive pin recess extending axially in said outer circumferential wall;
   said boss portion positioned within said collar portion with said at least one second part drive pin recess axially aligned with said at least one first part drive pin recess to define at least one drive pin channel; and
   at least one drive pin received in said at least one drive pin channel, said drive pin adapted to couple said second part to said first part to allow unified rotation movement of said first and second part and to permit axial displacement therebetween.

2. The anti-backlash nut assembly recited in claim 1 wherein said first part is a worm gear and said second part is an anti-backlash nut.

3. The anti-backlash nut assembly recited in claim 1 wherein said first part is an anti-backlash nut and said second part is a worm gear.

4. The anti-backlash nut assembly recited in claim 1 wherein said at least one first part drive pin recess comprises a plurality of drive pin recesses, said at least one second part drive pin recess comprises a plurality of second part drive pin recesses, and said at least one drive pin comprises a plurality of drive pins.

5. The anti-backlash nut assembly recited in claim 4 wherein at least one of said plurality of drive pins is a key drive pin.

6. An anti-backlash nut assembly comprising:

a worm gear having a central threaded portion positioned along a central axis and adapted to mate with the threads of a jack screw, and a collar portion surrounding said threaded portion and extending axially away from said threaded portion, said collar portion having an inner circumferential wall with at least one drive pin recess extending axially therein;

an anti-backlash nut having a central threaded portion adapted to mate with said threads of said jack screw, and a boss portion coaxial with said nut threaded portion, said boss portion adapted for sliding engagement in said collar portion, said boss portion having an outer circumferential wall having at least one drive pin recess extending axially therein;

said boss portion positioned within said collar portion with said at least one nut drive pin recess axially aligned with said at least one worm gear drive pin recess to define at least one drive pin channel; and at least one drive pin received in said at least one drive pin channel adapted to couple said nut to said worm gear to allow unified rotational movement of said worm gear and said anti-backlash nut and to permit axial displacement therebetween.

7. The anti-backlash nut assembly recited in claim 6 wherein said at least one worm gear drive pin recess comprises a plurality of drive pin recesses, said at least one nut drive pin recess comprises a plurality of nut drive pin recesses, and said at least one drive pin comprises a plurality of drive pins.

8. The anti-backlash nut assembly recited in claim 7 wherein at least one of said plurality of drive pins is a key drive pin.

9. The anti-backlash nut assembly of claim 6 wherein said worm gear further comprises an exterior threaded portion.

10. In a worm gear jack comprising a lifting screw, having a longitudinal axis, a worm gear having a center threaded portion mating with said lifting screw, an anti-backlash nut having a center threaded portion adapted to engage said lifting screw, and a plurality of driving pins coupling said worm gear to said anti-backlash nut and adapted to provide unified rotational movement of said worm gear and said anti-backlash nut while permitting limited axial displacement therebetween, the improvement comprising a plurality of cylindrical cavities formed in axially aligned, mating portions of said worm gear and said anti-backlash nut, each of said pins housed in one of said cavities, each said cavity extending along the entire length of a pin disposed therein.

11. Worm gear jack as recited in claim 10 wherein said worm gear comprises a collar having an inner wall with axial extending hemi-cylindrical recesses therein, said anti-backlash nut comprising an annular boss positioned in said collar, said boss comprising hemi-cylindrical recesses therein, said collar recesses disposed in axial mating alignment with said boss recesses.

12. In a worm gear jack comprising a lifting screw having a longitudinal axis, a worm gear having a central threaded portion for threaded engagement with said lifting screw and an anti-backlash nut having a central threaded portion for threaded engagement with said lifting screw, a plurality of driving pins coupling said worm gear to said anti-backlash nut and permitting limited axial movement of said anti-backlash nut relative to said worm gear while permitted unified rotation of said worm gear and said anti-backlash nut, the improvement comprising drive pin support means formed between mating sections of said worm gear and said anti-backlash nut, respectively, said drive pin support means comprising a plurality of axially extending substantially cylindrical enclosures proportioned to extend along the entire length of said driving pins, each of said driving pins disposed in one of said enclosures in co-axial array around said longitudinal axis.

13. In a worm gear jack comprising a lifting screw having a longitudinal axis, a worm gear having a central threaded portion for threaded engagement with said lifting screw and an anti-backlash nut having a center threaded portion adapted to engage said lifting screw, and a plurality of driving pins coupling said worm gear to said anti-backlash nut and adapted to provide for unified rotational movement of said worm gear and said anti-backlash nut while permitting limited axial displacement therebetween, the improvement comprising boss means carried by either said worm gear or said anti-backlash nut, collar means carried by the other of said worm gear or said anti-backlash nut, said boss means positioned in said collar means, a plurality of hemi-cylindrical recesses formed around said boss means with each disposed in parallel to said longitudinal axis, a plurality of hemi-cylindrical recesses formed along an inner surface of said collar means, said boss means recesses in matching axial alignment with said collar means recesses to form a plurality of substantially cylindrical enclosures, each of said driving pins positioned in one of said enclosures, said collar means recesses supporting said driving pins along the entire axial length of said pins.

14. Worm gear jack as recited in claim 13 wherein said collar means recesses support said driving pins throughout about 180° of the circumference of each pin.

15. Worm gear jack as recited in claim 13 wherein said boss means recesses support each of said pins along the entire length of each pin except for a small lengthwise portion of said pin equal to an axial spacing of said worm gear from said anti-backlash nut.

16. An anti-backlash nut assembly comprising:

a first nut having a first central threaded portion adapted to mate with the threads of a screw, and a first circumferential wall spaced apart radially outward from said central threaded portion, said first circumferential wall facing radially outward and defining a first longitudinally extending recess therein;

a second nut having a second central threaded portion adapted to mate with the threads of said screw, and a second circumferential wall spaced apart radially outward from said second central portion, said second circumferential wall facing radially inward and defining a second longitudinally extending recess therein, said second longitudinally extending recess cooperating with said first longitudinally extending recess to define a channel; and a pin slidingly received within said channel.

* * * * *